US 8,236,875 B2

(12) United States Patent
Recker et al.

(10) Patent No.: US 8,236,875 B2
(45) Date of Patent: Aug. 7, 2012

(54) RUBBER MIXTURE COMPRISING ENVIRONMENTALLY FRIENDLY SOFTENERS

(75) Inventors: Carla Recker, Hannover (DE); Thorsten Reese, Neustadt (DE); Jens Schöning, Nienstedt (DE)

(73) Assignee: Continental Reifen Deutschland GmbH (DE)

( * ) Notice: Subject to any disclaimer, the term of this patent is extended or adjusted under 35 U.S.C. 154(b) by 0 days.

(21) Appl. No.: 12/929,298

(22) Filed: Jan. 13, 2011

(65) Prior Publication Data

US 2011/0112213 A1 May 12, 2011

Related U.S. Application Data

(63) Continuation of application No. PCT/EP2009/056714, filed on Jun. 2, 2009.

(30) Foreign Application Priority Data

Jul. 31, 2008 (DE) .......................... 10 2008 035 962
Aug. 14, 2008 (DE) .......................... 10 2008 037 714

(51) Int. Cl.
*A01G 9/02* (2006.01)

(52) U.S. Cl. ........ 523/156; 524/575; 524/317; 524/300; 524/575.5; 524/571

(58) Field of Classification Search .................... 523/156
See application file for complete search history.

(56) References Cited

U.S. PATENT DOCUMENTS

| 4,737,535 | A | 4/1988 | Furukawa et al. |
| 5,447,971 | A * | 9/1995 | Bergh et al. .................... 523/213 |
| 5,872,179 | A * | 2/1999 | Hubbell ........................ 524/526 |
| 6,523,585 | B1 * | 2/2003 | Ducci et al. ................ 152/152.1 |
| 6,635,700 | B2 | 10/2003 | Cruse et al. |
| 6,822,043 | B2 | 11/2004 | Söhnen et al. |
| 7,247,678 | B2 * | 7/2007 | Nishihara et al. ............. 525/191 |
| 7,253,225 | B2 | 8/2007 | Labauze et al. |
| 7,335,692 | B2 | 2/2008 | Vasseur et al. |
| 7,531,588 | B2 | 5/2009 | Weller et al. |
| 2002/0010275 | A1 | 1/2002 | Maly et al. |
| 2002/0042462 | A1 | 4/2002 | Nohara et al. |
| 2002/0117388 | A1 * | 8/2002 | Denison .......................... 201/25 |
| 2006/0161015 | A1 | 7/2006 | Klockmann et al. |
| 2007/0167557 | A1 | 7/2007 | Dumke et al. |
| 2008/0194748 | A1 * | 8/2008 | Futamura ....................... 524/394 |

FOREIGN PATENT DOCUMENTS

| DE | 101 08 981 | 9/2002 |
| DE | 102 15 679 | 11/2003 |
| DE | 10 2005 040 490 | 2/2007 |
| EP | 0 708 137 | 4/1996 |
| WO | WO 99/09036 | 2/1999 |

* cited by examiner

*Primary Examiner* — Doris Lee
(74) *Attorney, Agent, or Firm* — Walter Ottesen

(57) ABSTRACT

The invention relates to a rubber mixture, in particular for vehicle air-inflated tires, seat belts, belts and hoses. The rubber mixture is characterized by the following composition:
at least one polar or non-polar rubber and at least one bright and/or dark filler and at least one softener, wherein the softener is free of polycyclic aromatics according to Directive 76/769/EEC, and wherein the carbon source for the softener comes from non-fossil sources, and other additives.

67 Claims, No Drawings

RUBBER MIXTURE COMPRISING ENVIRONMENTALLY FRIENDLY SOFTENERS

CROSS REFERENCE TO RELATED APPLICATIONS

This application is a continuation application of international patent application PCT/EP 2009/056714, filed Jun. 2, 2009, designating the United States and claiming priority from German applications 10 2008 035 962.9 and 10 2008 037 714.7, filed Jul. 31, 2008 and Aug. 14, 2008, respectively, and the entire content of all applications is incorporated herein by reference.

FIELD OF THE INVENTION

The invention relates to a rubber mixture, in particular for pneumatic tires, drive belts and other belts, and hoses.

BACKGROUND OF THE INVENTION

The rubber constitution of the tread is a major factor determining the running properties of a tire, in particular of a pneumatic tire. The rubber mixtures found in drive belts, hoses and other belts, especially in the locations subjected to high mechanical load, are likewise substantially responsible for stability and durability of the rubber products. These rubber mixtures for pneumatic tires, drive belts, other belts and hoses are therefore subject to very stringent requirements.

By way of example, the running properties of tires have been raised to a higher overall level in the past by partial or complete replacement of carbon black filler by silica in rubber mixtures. However, the known conflicting objectives relating to tire properties that have inversely correlated behavior continue to exist, even in tread mixtures comprising silica. By way of example, an improvement in wet grip and in dry braking generally continues to be associated with impairment of rolling resistance, of winter properties and of abrasion behavior. Good grip and low abrasion are also an important quality criterion in industrial rubber products, such as drive belts and other belts.

Many different approaches have been taken in attempts to resolve these conflicting objectives. By way of example, a very wide variety of polymers, resins and fine-particle fillers, where these include modified materials, have been used for rubber mixtures, and attempts have been made to influence vulcanizate properties by modifying the mixture-production process.

Another important class of additives, alongside rubber and fillers, is that of the plasticizers. Large amounts of plasticizers are sometimes added to rubber mixtures in order to reduce the cost of the mixture, to improve the flow properties of the mixture (energy saving during processing, avoidance of energy peaks), improve filler dispersion, improve compounding behavior and adhesion behavior, and influence the physical properties of the mixture and of the vulcanizates produced therefrom.

Alongside the aromatic, naphthenic and paraffinic mineral-oil plasticizers usually used in rubber mixtures, there are various synthetic plasticizers that are used in rubber mixtures, for example, thioesters, phthalic esters, aromatic polyethers, phosphoric esters, sebacic esters or low-molecular-weight, polymeric polyesters.

However, the production of these plasticizers is expensive and requires a large amount of energy. It moreover uses raw materials such as petroleum which will become unacceptable from an environmental point of view, and especially in respect of the current situation on emissions of hazardous materials and raw-material shortages. Attempts are being made, as an alternative, to use vegetable oils as plasticizers in rubber mixtures. However, the rubber industry does not have access to unlimited amounts of these.

The following publications may be mentioned by way of example of a large number of others relating to the use of the abovementioned plasticizers: EP 0 708 137 A1; US 2002/0010275 A1; US 2002/0042462 A1; U.S. Pat. No. 4,737,535; DE 101 08 981 A1; and, U.S. Pat. No. 7,335,692.

European patent application 0 708 137 A1 describes vulcanizates which comprise no aromatic process oils, but comprise at least one plasticizer (for example, dioctyl phthalate), liquid polymer and/or asphaltenes and, as filler, silica and carbon black in a ratio of from 1:1 to 20:1, the aim being to avoid any occurrence of black markings caused by abrasion and by discoloration in the original rubber mixture.

United States patent application publication 2002/0010275 A1 discloses addition of from 1 to 20 phr of a low-molecular-weight polyester plasticizer selected from polyester sebacate, triethylene glycol caprate-caprylate, triethylene glycol diheptanoate, triethylene glycol dipelargonate and triethylene glycol di-2-ethyl hexoate to a tread rubber mixture, the intention being to soften the tread and to improve the traction behavior of high-performance tires.

United States patent application publication 2002/0042462 A1 discloses rubber mixtures for tires which comprise reinforcing fillers and an ester, the aim being to improve processability without disadvantages in other properties. The ester here is one selected from an ester of an aliphatic, polybasic carboxylic acid with a polyoxyalkylene derivative and an ester of an aromatic, polybasic carboxylic acid with a polyoxyalkylene derivative.

U.S. Pat. No. 4,737,535 describes tires intended to have improved adhesion properties, steering stability properties and low-temperature properties. The tires have treads made of a rubber mixture, which comprises from 15 to 50 phr of SSBR, at least one plasticizer selected from a sebacic ester, an adipic ester and a fatty acid ester, and carbon black.

German patent publication 101 08 981 A1 and U.S. Pat. No. 7,335,692 disclose the use of proteins made from oil seed, or sunflower oil, as plasticizers in rubber mixtures, particularly for pneumatic tires. The vegetable oils described in those documents can be used as sole plasticizer but are mostly used in combination with another plasticizer obtained from petroleum.

SUMMARY OF THE INVENTION

It is an object of the invention to provide a rubber mixture, particularly for pneumatic tires, drive belts, other belts and hoses, which comprises at least one alternative and environmentally compatible plasticizer, thus permitting reduction of the usage-related emissions of hazardous substances from the rubber mixture. At the same time, the intention is to increase the durability and environmental compatibility of rubber mixtures and to ensure independence from petroleum as raw-material source and energy source.

The object of the invention is achieved via a rubber mixture with the following constitution:
 at least one polar or nonpolar rubber and
 at least one pale-colored and/or dark-colored filler and
 at least one plasticizer, where the plasticizer is free from polycyclic aromatics, and
 further additives.

The phr (parts per hundred parts of rubber by weight) data used in this specification are the conventional quantitative data used in the rubber industry for mixture formulations. The amounts added in parts by weight of the individual substances here are always related to 100 parts by weight of the total mass of all of the rubbers present in the mixture.

Surprisingly, it has been found that better durability and environmental compatibility of rubber mixtures is ensured by combining at least one polar or nonpolar rubber, at least one pale-colored and/or dark-colored filler, and other additives conventional in the rubber industry, and at least one plasticizer which is free from polycyclic aromatics. At the same time, the plasticizer, which is free from polycyclic aromatics, is not based on petroleum, which provides independence from said raw-material source and energy source. A relevant point here is that the physical properties of the rubber mixture remain at the same level. This applies not only to tire treads with divided tread, particularly for the base, but also to other internal tire components. The collective term used below for the rubber mixtures for the other internal tire components is also the term usually used in tire technology: body compounds or body mixtures.

The rubber mixture of the invention is also used in the development of mixtures for drive belts, other belts and hoses. These industrial rubber products are used in all aspects of everyday life, for example, in elevators, in the automobile industry, in the raw-materials industry, in the food-and-drink industry and in medical technology. Here again, therefore, the improved environmental compatibility together with unaltered properties of the mixture are of central importance.

The rubber mixture comprises at least one polar or nonpolar rubber. The polar or nonpolar rubber here is one selected from the group consisting of natural polyisoprene and/or synthetic polyisoprene and/or butadiene rubber and/or styrene-butadiene rubber and/or solution-polymerized styrene-butadiene rubber and/or emulsion-polymerized styrene-butadiene rubber and/or liquid rubbers and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluoro rubber and/or silicone rubber and/or polysulfide rubber and/or epichlorohydrin rubber and/or styrene-isoprene-butadiene terpolymer and/or hydrogenated acrylonitrile-butadiene rubber and/or isoprene-butadiene copolymer and/or hydrogenated styrene-butadiene rubber.

Production of industrial rubber products, such as drive belts, other belts and hoses, particularly uses nitrile rubber, hydrogenated acrylonitrile-butadiene rubber, chloroprene rubber, butyl rubber, halobutyl rubber or ethylene-propylene-diene rubber.

However, it is preferable that the rubber mixture comprises natural and/or synthetic polyisoprene and specifically amounts of from 0 to 50 phr, preferably from 0 to 40 phr, particularly preferably amounts of from 0 to 30 phr, and with further particular preference amounts of from 0 to 20 phr, but at least 0.1 phr, in particular at least 0.5 phr. In one particular embodiment, the polar or nonpolar rubber is a diene rubber, which can have been hydrogenated. The amounts used of the butadiene rubber are preferably from 2 to 60 phr, with preference from 2 to 50 phr, with particular preference from 5 to 50 phr, with very particular preference from 10 to 50 phr, and with further particular preference from 10 to 45 phr.

The polar or nonpolar rubber can be a styrene-butadiene rubber, preferably solution-polymerized or emulsion-polymerized. The styrene-butadiene rubber can have been hydrogenated and in one particularly advantageous embodiment has been solution-polymerized.

The styrene-butadiene rubber can moreover have been modified with hydroxy groups and/or epoxy groups and/or siloxane groups and/or amino groups and/or aminosiloxane and/or carboxy groups and/or phthalocyanine groups. However, it is also possible to use other modifications known to the person skilled in the art, these also being termed functionalizations.

The amounts used of the styrene-butadiene rubber are from 2 to 98 phr, preferably from 2 to 90 phr, particularly preferably from 2 to 80 phr, and with further particular preference from 5 to 80 phr.

The rubber mixture of the invention moreover comprises at least one pale-colored and/or dark-colored filler. The total amount of filler can therefore consist solely of pale-colored or dark-colored filler, or of a combination of pale-colored and dark-colored fillers.

It is preferable that the pale-colored filler is silica, preferably precipitated silica.

The rubber mixture of the invention comprises from 1 to 300 phr, preferably from 1 to 250 phr, particularly preferably from 1 to 200 phr, and with further particular preference from 1 to 150 phr, and with further very particular preference from 1 to 100 phr, of silica. Of this total amount of silica, it is possible that from 0 to 100% are coupled to the polymer matrix via a coupling agent, preferably silane, and/or that from 0 to 100% are not coupled to the polymer matrix. This means that, starting from the total amount of silica, this is coupled completely or only partially to the polymer matrix via the coupling agent, or that no coupling of any kind takes place between the silica and the polymer matrix.

The silicas used in the tire industry are generally precipitated silicas, and these are in particular characterized according to their surface area. The characteristics used here are the nitrogen surface area (BET) to DIN 66131 and DIN 66132 as a measure of the interior and exterior surface area of the filler in $m^2/g$, and the CTAB surface area to ASTM D3765 as a measure of the exterior surface area, which is often regarded as the surface area effective for the purposes of a rubber, stated in $m^2/g$.

The invention uses silicas with a nitrogen surface area greater than or equal to 100 $m^2/g$, preferably from 120 to 300 $m^2/g$, particularly preferably from 140 to 250 $m^2/g$, and with a CTAB surface area of from 100 to 250 $m^2/g$, preferably from 120 to 230 $m^2/g$, and particularly preferably from 140 to 200 $m^2/g$.

If a coupling agent is used, in the form of silane or of an organosilicon compound, the amount of the coupling agent is from 0 to 20 phr, preferably from 0.1 to 15 phr, particularly preferably from 0.5 to 10 phr. The coupling agents used here can comprise any of the coupling agents known to the person skilled in the art for use in rubber mixtures. Particular mention may be made here of mercaptosilanes and, among these, particularly those which feature a reduction of volatile organic constituents, for example those that can be found in United States patent application publication 2006/0161015 and international patent publication WO99/09036 and U.S. Pat. Nos. 6,635,700 and 7,531,588, by way of examples of other publications.

The dark-colored filler is preferably carbon black and specific preference is given to amounts of from 0 to 100 phr of at least one carbon black, particularly preferably amounts of from 0 to 80 phr, but at least 0.1 phr, in particular however at least 0.5 phr. In one particularly preferred embodiment, the iodine number of the carbon black to ASTM D1510, also termed iodine-absorption number, is greater than or equal to 75 g/kg, and its DBP number is greater than or equal to 80 $cm^3/100$ g. The DBP number determined to ASTM D2414 determines the specific absorption volume of a carbon black or of a pale-colored filler by using dibutyl phthalate.

The use of this type of carbon black in the rubber mixture, particularly for pneumatic tires, ensures a best-possible compromise of abrasion resistance and heat accumulation, which in turn affects the rolling resistance, which is relevant for environmental reasons. It is preferable here that only one type of carbon black is used in the respective rubber mixture, but it is also possible to incorporate various types of carbon black by mixing into the rubber mixture.

In a preferred embodiment, the rubber mixture comprises at least one plasticizer which is free from polycyclic aromatics and the carbon source of which derives from non-fossil sources.

Plasticizer oils have hitherto generally been produced from petroleum, stocks of which are subject to restriction, since it involves an exhaustible fossil source. In order to achieve independence from petroleum as raw-material source and energy source and at the same time to achieve improved environmental compatibility, the plasticizer, which is free from polycyclic aromatics, is produced via at least one biomass-to-liquid process, where the biomass can be in liquid and/or solid form.

Polycyclic aromatics are regarded as particularly critical for the environment, and are generally found in a wide variety of substances, in particular here plasticizers, which are based on petroleum as raw material. Free from polycyclic aromatics, which are also termed polycyclic aromatic hydrocarbons, means that the content of benzo(a)pyrene in the plasticizer is smaller than 1 mg/kg and the entirety of benz(a)anthracene, chrysene, benzo(b)fluoranthene, benzo(j)fluoranthene, benzo(k)fluoranthene, benzo(e)pyrene, benzo(a)pyrene and bibenz(a,h)anthracene—in accordance with European Community Directive 76/769/EEC—must be smaller than 10 mg/kg.

Biomass-to-liquid processes are usually thermochemical processes that convert organic substances into liquid hydrocarbon mixtures, which are generally used as fuels. A distinction is made between two-stage processes in which, within the biomass-to-liquid process, there is in essence a first step involving production of a synthesis gas by means of gasification and a second step involving synthesis of a motor-vehicle fuel. There are also known direct processes, for example as previously described in German patent publications 102 15 679 A1 and 10 2005 040 490 A1. The processes usually used for producing automobile fuels frequently produce heavy oil fractions which are undesired and are discarded.

It is also possible to control the processes to give targeted synthesis of an appropriate heavy oil fraction.

Surprisingly, it has been found that this heavy oil fraction is suitable as plasticizers, in particular as plasticizer oil which is free from polycyclic aromatics, for rubber mixtures.

Any biomass-to-liquid process known to those skilled in the art can be used for producing the plasticizer which is free from polycyclic aromatics.

Examples that may be mentioned here are flash pyrolysis, with very short residence times in the reactor, hydrogenating direct liquefaction, which uses (pressurized) hydrogen during the pyrolysis process to produce stable hydrocarbon products, the process known as carbo-V, which is based on the Fischer-Tropsch process, and catalytic direct liquefaction, in which the pyrolysis process takes place in an oil sump with admixture of catalyst.

However, it has proven advantageous that the plasticizer, which is free from polycyclic aromatics, has been produced by using catalytic direct liquefaction of biomasses.

This type of process for direct liquefaction of biomasses is known from Willner, Marktfruchtreport 2005, Mitteilungen der Landwirtschaftskammer, Landwirtschaftskammer Schleswig-Holstein, Kiel [Winner, Report on food crops, 2005, Communications from the Chamber of Agriculture, Schleswig-Holstein Chamber of Agriculture, Kiel].

In one particular embodiment, therefore, the plasticizer which is present in the rubber mixture of the invention and which is free from polycyclic aromatics takes the form of heavy oil fraction after completion of catalytic direct liquefaction of biomasses, and has at least 25 carbon atoms in the hydrocarbon chain, which may be a branched or unbranched chain. The biomass here can be in liquid and/or solid form.

The amounts used of the plasticizer, which is free from polycyclic aromatics, are from 0.1 to 150 phr, preferably from 0.1 to 120 phr, particularly preferably from 0.1 to 100 phr, with further particular preference from 0.1 to 80 phr, with further very particular preference from 0.1 to 60 phr.

From 0 to 5 phr of at least one further additional plasticizer may also be present in the rubber mixture. This further plasticizer is one selected from the group consisting of mineral oils and/or synthetic plasticizers and/or fatty acids and/or fatty acid derivatives and/or resins and/or factices and/or glycerides and/or terpenes.

If mineral oil is used it is preferably one selected from the group consisting of DAE (distilled aromatic extracts) and/or RAE (residual aromatic extract) and/or TDAE (treated distilled aromatic extracts) and/or MES (mild extracted solvents) and/or naphthenic oils.

The rubber mixture also comprises further additives.

The term further additives in essence includes the crosslinking system (crosslinking agent, sulfur donors and/or elemental sulfur, accelerators and retarders), antiozonants, antioxidants, mastication aids and other activators. The quantitative proportion of the total amount of further additives is from 3 to 150 phr, preferably from 3 to 100 phr and particularly preferably from 5 to 80 phr.

The total quantitative proportion of the further additives also comprises from 0.1 to 10 phr, preferably from 0.2 to 8 phr, particularly preferably from 0.2 to 4 phr, of zinc oxide.

It is common to add zinc oxide as activator mostly in combination with fatty acids (for example, stearic acid) to a rubber mixture for sulfur crosslinking with vulcanization accelerators. The sulfur is then activated via complex formation for the vulcanization process. The zinc oxide conventionally used here, generally has a BET surface area of less than 10 m$^2$/g; however, it is also possible to use what is known as nanozinc oxide with a BET surface area of from 10 to 60 m$^2$/g.

The rubber mixture is preferably vulcanized in the presence of elemental sulfur or sulfur donors, and some sulfur donors can simultaneously act here as vulcanization accelerators. The amounts added of elemental sulfur or sulfur donors in the final mixing step to the rubber mixture are those familiar to the person skilled in the art (from 0.4 to 9 phr, preferred amounts of elemental sulfur being from 0 to 6 phr, particularly preferably from 0.1 to 3 phr). The rubber mixture can comprise substances that influence vulcanization, for example, vulcanization accelerators, vulcanization retarders, which in the invention are included within the additives described above, and vulcanization activators, as described above, in order to control the time and/or temperature required for the vulcanization process and in order to improve vulcanizate properties.

The rubber mixture of the invention is produced by the processes conventional in the rubber industry, by firstly producing, in one or more mixing stages, a parent mixture with all of the constituents other than the vulcanization system (sulfur and substances influencing vulcanization). The finished mixture is produced via addition of the vulcanization system in a final mixing stage. The finished mixture is further processed by way of example via an extrusion procedure, and is converted to the appropriate form.

Another object of the invention is to use the rubber mixture described above for producing pneumatic tires, in particular for producing the tread of a tire and/or a body mixture of a tire, and for producing drive belts, other belts and hoses.

For use in pneumatic tires, the mixture is preferably converted to the form of a tread and applied in a known manner during production of the green tire. However, the tread can also be wound in the form of a narrow strip of rubber mixture onto a green tire. If the tread has been divided into two, as described above, the rubber mixture is preferably used as mixture for the base.

The method for producing the rubber mixture of the invention for use as body mixture in tires is as described above for the tread. The difference lies in the shaping after the extrusion procedure. The resultant forms of the rubber mixture of the invention for one or more different body mixtures then serve for construction of a green tire. For use of the rubber mixture of the invention in drive belts and other belts, particularly in conveyor belts, the extruded mixture is converted to the appropriate form and during this process or subsequently is often provided with reinforcing materials, for example, synthetic fibers or steel cord. This mostly gives a multilayer structure, composed of one and/or more sublayers of rubber mixture, one and/or more sublayers of identical and/or different reinforcing materials and one and/or more further sublayers of the same and/or another rubber mixture.

For use of the rubber mixture of the invention in hoses, preference is often given to peroxidic crosslinking, rather than what is known as sulfur crosslinking.

The production process for the hoses is based on the process described in Handbuch der Kautschuktechnologie [Rubber technology], Dr. Gupta Verlag, 2001, chapter 13.4. By virtue of its environmentally compatible properties and its low carcinogenicity due to freedom from polycyclic aromatics under Directive 76/769/EEC, the rubber mixture of the invention is particularly used in food-or-drink hoses, and especially here in drinking-water hoses, medical hoses and pharmaceutical hoses.

Comparative and inventive examples collated in Tables 1a and 1b, and 2a and 2b, will now be used for further explanation of the invention. The mixtures characterized by "I" here are mixtures of the invention, whereas the mixtures characterized by "C" are comparative mixtures.

In all of the mixture examples present in the table, the stated quantitative data are parts by weight, based on 100 parts by weight of the entire amount of rubber (phr).

The mixtures were produced under conventional conditions in two stages in a laboratory tangential mixer. All of the mixtures were used to produce test specimens via vulcanization, and these test specimens were used to determine typical rubber-industry properties of the materials. The test methods used for these tests were as follows:

Shore A hardness at room temperature to DIN 53 505
rebound resilience at room temperature and 70° C. to DIN 53 512
stress values for 100% and 300% tensile strain at room temperature to DIN 53 504
tensile strength at room temperature to DIN 53 504
Grosch abrasion as in Grosch, K. A., 131st ACS Rubber Div. Meeting, No. 97 (1987) and Grosch, K. A. et al., Kautschuk Gummi Kunststoffe, 50, 841 (1997)

TABLE 1a

| Constituents | Unit | C1 | C2 | I1 |
|---|---|---|---|---|
| Polyisoprene[a] | phr | 20 | 20 | 20 |
| BR[b] | phr | 44 | 44 | 44 |
| SSBR[c] | phr | 36 | 36 | 36 |
| Silica[d] | phr | 95 | 95 | 95 |
| Mineral oil[e] | phr | 45 | — | — |
| Mineral oil[f] | phr | — | 45 | — |
| Plasticizer[g] | phr | — | — | 45 |
| ZnO | phr | 2.5 | 2.5 | 2.5 |
| Silane[h] | phr | 6.65 | 6.65 | 6.65 |
| DPG, CBS, sulfur | phr | 5.6 | 5.6 | 5.6 |

[a]TSR
[b]High-cis polybutadiene, proportion of cis material ≧95% by wt.
[c]SSBR styrene-butadiene rubber, Nipol NS116R, Nippon Zeon
[d]VN3, Evonik
[e]TDAE
[f]MES
[g]BTL bio-oil, benzo(a)pyrene: 69.116 µg/kg, entirety of polycyclic aromatics as in Directive 76/769/EEC: 445.121 µg/kg
[h]A1589, Momentive Performance Materials TABLE 1b

| Properties | Unit | C1 | C2 | I1 |
|---|---|---|---|---|
| Hardness at RT | Shore A | 64.5 | 64.2 | 66.3 |
| Rebound at RT | % | 30.6 | 32.5 | 29.6 |
| Rebound at 70° C. | % | 41.5 | 41.4 | 39.4 |
| 100% stress value | MPa | 1.59 | 1.63 | 1.61 |
| 300% stress value | MPa | 5.33 | 5.41 | 5.15 |
| Tensile strength at RT | MPa | 12.6 | 12.8 | 12.7 |

TABLE 2a

| Constituents | Unit | C3 | C4 | C5 | C6 | I2 | I3 |
|---|---|---|---|---|---|---|---|
| Polyisoprene[a] | phr | — | — | — | — | — | — |
| BR[b] | phr | 23 | 23 | 23 | 23 | 23 | 23 |
| SSBR[c] | phr | 77 | 77 | 77 | 77 | 77 | 77 |
| Silica[d] | phr | 95 | 95 | 95 | 95 | 95 | 95 |
| Mineral oil[e] | phr | 30 | 40 | — | — | — | — |
| Mineral oil[f] | phr | — | — | 30 | 40 | — | — |
| Plasticizer[g] | phr | — | — | — | — | 30 | 40 |
| ZnO | phr | 2.5 | 2.5 | 2.5 | 2.5 | 2.5 | 2.5 |
| Silane[h] | phr | 8.1 | 8.1 | 8.1 | 8.1 | 8.1 | 8.1 |
| DPG, CBS, sulfur | phr | 6 | 6 | 6 | 6 | 6 | 6 |

[a]TSR
[b]High-cis polybutadiene, proportion of cis material ≧ 95% by wt.
[c]SSBR styrene-butadiene rubber, Nipol NS116R, Nippon Zeon
[d]VN3, Evonik
[e]TDAE
[f]MES
[g]BTL bio-oil, benzo (a) pyrene: 69.116 µg/kg, entirety of polycyclic aromatics as in Directive 76/769/EEC: 445.121 µg/kg
[h]A1589, Momentive Performance Materials TABLE 2b

| Properties | Unit | C3 | C4 | C5 | C6 | I2 | I3 |
|---|---|---|---|---|---|---|---|
| Hardness at RT | Shore A | 76.7 | 73 | 76.2 | 71.5 | 77.1 | 72.7 |
| Rebound at RT | % | 23.4 | 22.9 | 24.6 | 25.5 | 22.4 | 22.8 |
| Rebound at 70° C. | % | 46.2 | 44.6 | 43.7 | 43.7 | 42.2 | 41.5 |
| 100% stress value | MPa | 3.4 | 2.93 | 3.46 | 2.8 | 3.5 | 2.81 |
| 300% stress value | MPa | 11.44 | 9.58 | 11.66 | 9.25 | 11.67 | 9.19 |

TABLE 2b-continued

| Properties | Unit | C3 | C4 | C5 | C6 | I2 | I3 |
|---|---|---|---|---|---|---|---|
| Tensile strength at RT | MPa | 12.7 | 14.3 | 14.1 | 14.6 | 15.8 | 13.7 |
| Abrasion | % | 100 | | 101 | | 99 | |

When the mixture constitutions presented in Tables 1a and 2a are considered together with the resultant physical properties presented in Tables 1b and 2b, it can be stated in summary that the properties of the mixtures remain at approximately the same level when plasticizers which are free from polycyclic aromatics are used.

The hardnesses of the mixtures remain almost constant, and other values that remain the same, within the limits of accuracy of measurement, when the rubber mixtures I1 to I3 of the invention are compared with the comparative mixtures C1 to C6 are the wet-braking behavior, represented by the rebound value at room temperature, and the rolling-resistance behavior, which is environmentally relevant and is represented by the rebound value at 70° C. The same thing can also be said for the ultimate tensile strength properties represented by the stress values and the tensile strength. Nor is any impairment of abrasion behavior apparent with use of plasticizers which are free from polycyclic aromatics.

It is understood that the foregoing description is that of the preferred embodiments of the invention and that various changes and modifications may be made thereto without departing from the spirit and scope of the invention as defined in the appended claims.

What is claimed is:

1. A rubber mixture, comprising:
   at least one polar or nonpolar rubber;
   at least one pale-colored and/or dark-colored filler;
   at least one plasticizer, where the plasticizer is free from polycyclic aromatics, as in Directive 76/769/EEC, and the carbon source for the plasticizer derives from nonfossil sources and the plasticizer takes the form of a heavy oil fraction and has at least 25 carbon atoms in the hydrocarbon chain, which may be a branched or unbranched chain; and
   further additives.

2. The rubber mixture as claimed in claim 1, wherein the polar or nonpolar rubber is selected from the group consisting of natural polyisoprene; synthetic polyisoprene; butadiene rubber; styrene-butadiene rubber; solution-polymerized styrene-butadiene rubber; emulsion-polymerized styrene-butadiene rubber; liquid rubbers; halobutyl rubber; polynorbornene; isoprene-isobutylene copolymer; ethylene-propylene-diene rubber; nitrile rubber; chloroprene rubber; acrylate rubber; fluoro rubber; silicone rubber; polysulfide rubber; epichlorohydrin rubber; styrene-isoprene-butadiene terpolymer; hydrogenated acrylonitrile-butadiene rubber; isoprene-butadiene copolymer; and hydrogenated styrene-butadiene rubber, or a mixture thereof.

3. The rubber mixture as claimed in claim 1, wherein the polar or nonpolar rubber is at least one natural polyisoprene.

4. The rubber mixture as claimed in claim 1, wherein the polar or nonpolar rubber is at least one synthetic polyisoprene.

5. The rubber mixture as claimed in claim 1, wherein the polar or nonpolar rubber is at least one butadiene rubber.

6. The rubber mixture as claimed in claim 5, wherein the butadiene rubber is a hydrogenated butadiene rubber.

7. The rubber mixture as claimed in claim 1, wherein the polar or nonpolar rubber is at least one styrene-butadiene rubber.

8. The rubber mixture as claimed in claim 7, wherein the styrene-butadiene rubber is a solution-polymerized styrene-butadiene rubber.

9. The rubber mixture as claimed in claim 7, wherein the styrene-butadiene rubber is an emulsion-polymerized styrene-butadiene rubber.

10. The rubber mixture as claimed in claim 7, wherein the styrene-butadiene rubber is a hydrogenated styrene-butadiene rubber.

11. The rubber mixture as claimed in claim 1, wherein the rubber mixture comprises from 0 to 50 phr of natural polyisoprene and/or synthetic polyisoprene.

12. The rubber mixture as claimed in claim 11, wherein the rubber mixture comprises from 0 to 40 phr of natural polyisoprene and/or synthetic polyisoprene.

13. The rubber mixture as claimed in claim 12, wherein the rubber mixture comprises from 0 to 30 phr of natural polyisoprene and/or synthetic polyisoprene.

14. The rubber mixture as claimed in claim 13, wherein the rubber mixture comprises from 0 to 20 phr of natural polyisoprene and/or synthetic polyisoprene.

15. The rubber mixture as claimed in claim 11, wherein the rubber mixture comprises at least 0.1 phr, in particular at least 0.5 phr, of natural polyisoprene and/or synthetic polyisoprene.

16. The rubber mixture as claimed in claim 1, wherein the rubber mixture comprises from 2 to 60 phr of butadiene rubber.

17. The rubber mixture as claimed in claim 16, wherein the rubber mixture comprises from 2 to 50 phr of butadiene rubber.

18. The rubber mixture as claimed in claim 17, wherein the rubber mixture comprises from 5 to 50 phr of butadiene rubber.

19. The rubber mixture as claimed in claim 18, wherein the rubber mixture comprises from 10 to 50 phr of butadiene rubber.

20. The rubber mixture as claimed in claim 19, wherein the rubber mixture comprises from 10 to 45 phr of butadiene rubber.

21. The rubber mixture as claimed in claim 1, wherein the rubber mixture comprises from 2 to 98 phr of solution-polymerized styrene-butadiene rubber.

22. The rubber mixture as claimed in claim 21, wherein the rubber mixture comprises from 2 to 90 phr of solution-polymerized styrene-butadiene rubber.

23. The rubber mixture as claimed in claim 22, wherein the rubber mixture comprises from 2 to 80 phr of solution-polymerized styrene-butadiene rubber.

24. The rubber mixture as claimed in claim 23, wherein the rubber mixture comprises from 5 to 80 phr of solution-polymerized styrene-butadiene rubber.

25. The rubber mixture as claimed in claim 1, wherein the rubber has been modified.

26. The rubber mixture as claimed in claim 1, wherein the pale-colored filler is silica.

27. The rubber mixture as claimed in claim 26, wherein the silica is precipitated silica.

28. The rubber mixture as claimed in claim 1, wherein the rubber mixture comprises from 1 to 300 phr of silica.

29. The rubber mixture as claimed in claim 28, wherein the rubber mixture comprises from 1 to 250 phr of silica.

30. The rubber mixture as claimed in claim 29, wherein the rubber mixture comprises from 1 to 200 phr of silica.

31. The rubber mixture as claimed in claim 30, wherein the rubber mixture comprises from 1 to 150 phr of silica.

32. The rubber mixture as claimed in claim 31, wherein the rubber mixture comprises from 1 to 100 phr of silica.

33. The rubber mixture as claimed in claim 1, wherein the BET surface area of the silica is greater than or equal to 100 m²/g.

34. The rubber mixture as claimed in claim 1, wherein the extent of coupling of the silica to the polymer matrix via a coupling agent is zero or partial or complete.

35. The rubber mixture as claimed in claim 34, wherein the coupling agent is a silane.

36. The rubber mixture as claimed in claim 35, wherein the coupling agent is an organosilicon compound.

37. The rubber mixture as claimed in claim 34, wherein the amount of the coupling agent is from 0 to 20 phr.

38. The rubber mixture as claimed in claim 37, wherein the amount of the coupling agent is from 0.1 to 15 phr.

39. The rubber mixture as claimed in claim 38, wherein the amount of the coupling agent is from 0.5 to 10 phr.

40. The rubber mixture as claimed in claim 1, wherein the dark-colored filler is carbon black.

41. The rubber mixture as claimed in claim 1, wherein the rubber mixture comprises from 0 to 100 phr of at least one carbon black.

42. The rubber mixture as claimed in claim 41, wherein the rubber mixture comprises from 0 to 80 phr of at least one carbon black.

43. The rubber mixture as claimed in claim 1, wherein the rubber mixture comprises at least 0.1 phr, in particular at least 0.5 phr, of at least one carbon black.

44. The rubber mixture as claimed in claim 1, wherein the plasticizer which is free from polycyclic aromatics, as in Directive 76/769/EEC, and the carbon source of which derives from non-fossil sources has been produced via at least one biomass-to-liquid process.

45. The rubber mixture as claimed in claim 44, wherein the plasticizer which is free from polycyclic aromatics, as in Directive 76/769/EEC, and the carbon source of which derives from non-fossil sources has been produced via the catalytic direct liquefaction of biomasses.

46. The rubber mixture as claimed in claim 45, wherein the plasticizer which is free from polycyclic aromatics, as in Directive 76/769/EEC, and the carbon source of which derives from non-fossil sources is present in the form of heavy-oil fraction after completion of the catalytic direct liquefaction of biomasses.

47. The rubber mixture as claimed in claim 45, wherein the biomass is in liquid and/or solid form.

48. The rubber mixture as claimed in claim 1, wherein the rubber mixture comprises from 0.1 to 150 phr of a plasticizer which is free from polycyclic aromatics, as in Directive 76/769/EEC, and the carbon source of which derives from non-fossil sources.

49. The rubber mixture as claimed in claim 48, wherein the rubber mixture comprises from 0.1 to 120 phr of a plasticizer which is free from polycyclic aromatics, as in Directive 76/769/EEC, and the carbon source of which derives from non-fossil sources.

50. The rubber mixture as claimed in claim 49, wherein the rubber mixture comprises from 0.1 to 100 phr of a plasticizer which is free from polycyclic aromatics, as in Directive 76/769/EEC, and the carbon source of which derives from non-fossil sources.

51. The rubber mixture as claimed in claim 50, wherein the rubber mixture comprises from 0.1 to 80 phr of a plasticizer which is free from polycyclic aromatics, as in Directive 76/769/EEC, and the carbon source of which derives from non-fossil sources.

52. The rubber mixture as claimed in claim 51, wherein the rubber mixture comprises from 0.1 to 60 phr of a plasticizer which is free from polycyclic aromatics, as in Directive 76/769/EEC, and the carbon source of which derives from non-fossil sources.

53. The rubber mixture as claimed in claim 1, wherein the rubber mixture also comprises from 0 to 5 phr of at least one further plasticizer.

54. The rubber mixture as claimed in claim 53, wherein the further plasticizer has been selected from the group consisting of mineral oils; synthetic plasticizers; fatty acids; fatty acid derivatives; resins; factices; glycerides; and terpenes, or a mixture thereof.

55. The rubber mixture as claimed in claim 1, wherein the quantitative proportion of further additives is from 3 to 150 phr.

56. The rubber mixture as claimed in claim 55, wherein the quantitative proportion of further additives is from 3 to 100 phr.

57. The rubber mixture as claimed in claim 56, wherein the quantitative proportion of further additives is from 5 to 80 phr.

58. The method of producing a tire, comprising: preparing a rubber mixture as claimed in claim 1.

59. The method as claimed in claim 58 for producing the tread of a tire.

60. The method as claimed in claim 58 for producing a body mixture for a tire.

61. The method as claimed in claim 60 for producing a body mixture for a tire, including sidewall, inner liner, apex, belt, shoulder, belt profile, squeegee, carcass, bead reinforcement, other reinforcement inserts and/or solid tire.

62. The method for producing a belt, comprising: preparing a rubber mixture as claimed in claim 1.

63. The method as claimed in claim 62 for producing a conveyor belt.

64. The method as claimed in claim 63 for producing the non-load-bearing side of a conveyor belt.

65. The method for producing a drive belt, comprising: preparing a rubber mixture as claimed in claim 1.

66. The method as claimed in claim 65 for producing a flat drive belt, V-shaped drive belt, V-ribbed drive belt, or timing belt.

67. The method for producing a hose, comprising: preparing a rubber mixture as claimed in claim 1.

* * * * *